Patented Sept. 19, 1939

2,173,755

UNITED STATES PATENT OFFICE 2,173,755

NAIL ENAMEL

Henry C. Fuller, Washington, D. C.

No Drawing. Application May 9, 1936,
Serial No. 78,940

3 Claims. (Cl. 167—85)

This invention applies to a new and improved form of enamel for brightening and providing a gloss for the nails of the fingers and toes.

In the production of nail enamels it has heretofore been necessary to use an explosive substance such as nitrocotton as a base, with its attendant disadvantages, and therefore one of the principal objects of this invention is the use of a non-explosive, non-inflammable base substance, whereby said disadvantages are eliminated.

Another important object of this invention is the provision of a non-explosive, non-inflammable base substance used in producing nail enamels and combining said base with certain organic solvents differing in character from those heretofore employed in connection with the explosive type of base, so that the enamel may be produced without the attendant hazards heretofore prevalent and at the same time effect a nail enamel which will spread easily, dry quickly, leaving a glossy non-tacky surface, and at the same time one sufficiently durable to remain on the nails for several days.

Satisfactory nail enamels must spread easily, not run at the edges, dry within one and a half minutes leaving a smooth glossy surface that is, not tacky, the film not becoming dull and being sufficiently durable to remain on the nail for several days up to a week. The film should be removable by quick drying volatile solutions such as ethyl and butyl acetate.

Heretofore satisfactory nail enamels have depended upon low viscosity nitrocotton as a base. The nitrocotton is dissolved in a proper mixture of solvents usually ethyl and butyl acetates, and the desirable properties of the composition as a nail enamel enhanced by the addition of phthalates, camphor, castor oil, gums and resins.

As has been stated nitrocotton has been used as a base. This product because of its explosive nature and the danger attending its use, can only be compounded into nail enamels under very restricted conditions and only in plants adapted to the purpose. Many ordinances forbid the manipulation of nitrocotton mixtures within their jurisdictions, thus handicapping the producer of a nail enamel who desires to keep his formula secret, by necessitating its manufacture in an outside plant.

In order to overcome the objections to the compounding of a nitrocotton nail enamel and to provide a composition having all the desirable qualities of such a product, a new and improved form of nail enamel has been discovered in which nitrocotton has been eliminated and with solvents which are safe to use under ordinary precautions. The composition can be produced in any plant equipped with the proper mixing devices and may be stored and filled with ordinary precautions against fire.

I have found that by taking certain non-explosive and non-inflammable esters of cellulose and combining them with certain organic solvents of a character differing entirely from those employed in the nitro-cellulose type of nail enamel, I can produce a nail enamel possessing all the desirable features of such a product and free from all the dangers and hazards incident to the production of the nitro-cellulose composition.

As an example of my invention, I take cellulose aceto butyrate, or ethyl cellulose and dissolve them in ethylene dichloride, a solvent heretofore not used in nail enamels. I then take diethylene dioxide another solvent heretofore not used in nail enamels and in it dissolve resins and platicizers such as ester gum, vinyl resins, hydrocarbon resins, formaldehydeureas, camphor, etc., this mixture being poured into the solution of the cellulose ester and the whole well mixed.

A composition thus produced is clear, viscous, easily spread with a camel's-hair brush, does not run, dries rapidly leaving a clear hard non-tacky film of high lustre, which retains its form and gloss on the nail for several days. Such a composition may be colored in many shades and spreads with an even colored film without streaking or mottling, a condition which often occurs with nitro-cellulose films.

While I do not confine myself to the use of the non-explosive and non-inflammable cellulose esters, nor to the organic solvents above enumerated, but may use other cellulose esters and other solvents compatible therewith, I have found the following composition to be very effective as a nail enamel.

| | Parts by weight |
|---|---|
| Cellulose aceto butyrate | 10 |
| Ethylene dichloride | 25 |
| Diethylene dioxide | 40 |
| Camphor | 5 |
| Hydrocarbon resin | 5 |
| Butyl acetate | 10 |

Having thus described my invention, what I desire protected by Letters Patent is as set forth in the following claims:

1. A nail enamel comprising 10 parts of cellulose aceto butyrate dissolved in a solvent consisting of ethylene dichloride 25 parts and diethylene dioxide 40 parts and including 5 parts by weight of camphor as a plasticizer.

2. A nail enamel comprising 10 parts of ethyl cellulose dissolved in a solvent consisting of ethylene dichloride 25 parts and diethylene dioxide 40 parts and including 5 parts by weight of camphor as a plasticizer.

3. A nail enamel comprising an organic ester of cellulose 10 parts dissolved in a solvent consisting of ethylene dichloride 25 parts and diethylene dioxide 40 parts.

HENRY C. FULLER.